Patented Apr. 24, 1951

2,549,798

UNITED STATES PATENT OFFICE 2,549,798

PRODUCTION OF MAGNESIUM CHLORIDE FROM MAGNESIUM SILICATE ORE

Edwin A. Gee, Washington, D. C., and Morton T. Pawel, Norris, Tenn., assignors to the United States of America as represented by the Secretary of the Interior No Drawing. Application January 17, 1947, Serial No. 722,606

7 Claims. (Cl. 23—91)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

The invention relates to improvements in the production of magnesium chloride from magnesium silicate minerals and particularly it relates to the improvement in filtration characteristics of the acid digested mineral.

Certain silicate base magnesium minerals, particularly olivine, serpentine, forsterite, garnierite, and the like, have, because of their acid solubility characteristics and high magnesium content, been considered as excellent potential sources of magnesium. Many processes have been proposed for the recovery of magnesium therefrom and have been based on digestion and dissolution of the mineral olivine in hydrochloric acid. However, a great disadvantage in all such processes has been the concurrent formation of silica gels and colloidal silicic acid. These gels prevent rapid filtration and retain considerable portions of the soluble salts necessitating the use of excessive quantities of wash water to separate the magnesium chloride. This results in a greatly diluted solution which must be eventually concentrated.

Accordingly, it is an object of this invention to provide a digestion method permitting the rapid filtration of acid digested magnesium silicates. It is still another object of the invention to provide a more efficient process for the production of magnesium chloride from silicate-base magnesium minerals. Other objects and advantages will in part be obvious and in part appear hereinafter.

These objects are accomplished in accordance with this invention by the increment addition of one reactant to the other whereby gellation of the silica and silicic acid, liberated by the treatment of silicate compounds with acid, is substantially inhibited.

The invention accordingly comprises improvements in the process for the production of magnesium chloride by acid digestion of silicate base magnesium minerals.

The basic features in all currently proposed processes for the extraction of magnesium values from magnesium silicate minerals involve: Adding acid to the mineral in an approximately stoichiometric quantity equivalent to that necessary to produce soluble salts of the metallic components present therein, such as magnesium, iron, nickel, manganese, calcium, and the like. Thereafter, the reaction mixture is digested at temperatures of about 100 degrees centigrade, on completion of digestion, the impure magnesium chloride solution and insoluble silica residue is separated from the insoluble constituents by suitable means such as filtration or thickening. Thereafter, the impure mother liquor is neutralized with magnesia displacing metals such as iron and nickel as hydroxides and again separated—this step is generally accomplished by filtration, though the use of other means such as centrifugal separation is feasible. The filtrate is thereafter concentrated and this magnesium chloride solution may be further processed as desired; for example, converted to solid forms such as magnesium chloride flakes, calcined to magnesium oxide, or electrolyzed to metallic magnesium. It is again emphasized that the separation of the impure solution and silica consumes excessive quantities of water in order to properly leach the cake or to permit clarification of the solution which, being in a very dilute concentration, must in later steps be concentrated. Many implications are obvious—throughout the intervening steps—between silica separation, and final concentration in order to process a more dilute solution, equipment will of necessity be larger, taking up considerable space, and using more energy in transferring and concentrating than if a more concentrated solution were being so processed.

By this invention, it has been shown that rapid filtration in separating the silica from the impure magnesium chloride solution can be accomplished; that the amount of soluble magnesium retained in the filter cake is greatly minimized, thereby substantially decreasing the volume of water used to wash the filter cake and the impure magnesium chloride solution is much more concentrated than that obtained by previous processes.

In the basic features of operation of the present invention the mineral is first crushed and milled by suitable disintegrating means such as jaw crushers, hammer mills, and ball mills—to a product having particles not more than about minus 20 mesh in size and preferably having a major portion of the ground mineral in sizes not more than minus 200 mesh. A chemical analysis is thereafter made on the ground ore to ascertain the concentration of the various components—such as magnesium, iron, nickel, chromium, manganese, calcium, and other constituents. Calculations are then made to determine the theoretical amount of acid required for about 85 percent decomposition of the mineral. A major portion, preferably comprising between approximately 65 and 95 percent of the weight of the total calculated quantity of this acid, is mixed with a minor portion—preferably between approximately 15 and 35 percent by weight—of the sized mineral, and charged into a suitable digesting apparatus—preferably fitted with suitable agitating, vapor condensing, and heat transferring means. The mixture is continuously agitated and is heated to temperatures about its boiling point. Exothermicity of the reaction mass furnishes a large portion of the required heat. On completion of the reaction, the untreated portions of mineral and acid are intermixed to form a cold slurry, thereafter this slurry added to the digested acid-mineral increments, the mixture heated to temperatures about its boiling point, and digestion carried out as with the first increments. At this point, after completion of reaction, it has been found desirable to partially neutralize the unreacted acid with basic magnesium oxide; thereby precipitating impurities such as iron and permitting easier separation thereof. The extent to which it is neutralized is calculated from a determination of the unreacted acid present in the impure magnesium chloride-silica slurry and the exact method will become clearer in the ensuing discussion.

The insoluble silica is thereafter separated from the impure solution by suitable filtering means—preferably a vacuum or pressure filter and the filter cake washed with relatively small quantities of water. The best replacement of the mother liquor retained by the silica is obtained if the cake is washed while it is still relatively moist; that is before cracks form in the cake. The filtrate from this separation is then aerated and completely neutralized with sufficient basic magnesium oxide to precipitate residual soluble impurities such as iron. The neutralized solution is then filtered, washed with very small quantities of water, the filter cake discarded, and the filtrate and washings combined. This product is a relatively concentrated pure magnesium chloride solution.

The study of the process variables in the production of pure magnesium chloride from olivine involved determination of reaction velocity and extent of reaction; therefore, it was necessary to develop a relatively accurate control that would serve as a yardstick of comparison. The amount of hydrochloric acid, unreacted in a useful sense, remaining at any instant was found to be a reasonably reliable criterion. In using the expression "unreacted in a useful sense" there is involved all hydrochloric acid that does not combine directly with the magnesia of the olivine. It must subsequently be eliminated by neutralization if pure solutions are to be obtained since the acid may have in part resulted from hydrolysis of iron or other metallic chlorides or may have been unreacted, and solution of precipitated metal hydroxides will result with increasing acidity.

To determine the percent unreacted acid, the following method was used. A well diluted aliquot of the reaction mixture was titrated with 0.05 normal sodium hydroxide to the phenolphthalein end point, all iron was then oxidized to the ferric state with hydrogen peroxide and the total chloride determined by the Volhard method. The analytical results, calculated as hydrogen chloride equivalents, were used in the following expression:

$$pU = \frac{\text{phenophthalein acidity as HCl}}{\text{total chlorides as HCl}} \times 100$$

It is to be noted that the phenolphthalein acidity as HCl is in effect the sum of acidity from the hydrolysis of iron compounds and unreacted hydrochloric acid, while the denominator in addition includes the magnesium chloride present as HCl equivalents. Although precise results are not obtained, the technique was of sufficient accuracy for its intended purpose.

The solution resulting from digestion of olivine with hydrochloric acid contains "free" hydrochloric acid, ferrous iron, ferric iron, nickel, and manganese chlorides as the principal contaminants of the magnesium chloride. It is possible that a solvent extraction procedure using an immiscible organic liquid such as isopropyl ether, or a method based on the relative insolubility of magnesium chloride hexahydrate might perhaps be used to effect the separation of impurities from the magnesium chloride. However, the purification technique of neutralizing with recycled magnesium oxide to precipitate the impurities was chosen because the magnesium displaced from the oxide in the metathesis reactions would not contaminate the solution, and the simplicity of the process would render it economically desirable.

The pU index was used as a measure of the magnesium oxide required for neutralization as well as for the rate and extent of the dissolution. For a given attempted decomposition of a uniform charge of olivine and acid, the theoretical pU was calculated corresponding to any degree of completion of the reaction. From the same data, the required stoichiometric quantity of acid soluble magnesia was also determined. A cross plot of these quantities gave the theoretical quantity of soluble magnesium oxide required to neutralize a slurry or filtrate any pU index.

In the following description the various unit operations, processes, and problems involved in this invention for producing magnesium chloride from olivine will be covered insofar as practicable in the order in which they occur in the process as described above. In the discussion of the variables, it will be shown that the invention is operable over wide ranges but optimum conditions were ascertained and are presently preferred.

In the study of this process, a "standard" olivine was prepared from mineral obtained from the United Feldspar and Minerals Corporation, Spruce Pine, North Carolina. The material, as received, was first broken in a jaw crusher and hammer mill and then ball milled to a particle-size range desired for experimental work. Typical chemical and screen analyses are given in Tables 1 and 2 respectively.

TABLE 1

*"Standard" olivine composition*

| Component | MgO | SiO$_2$ | FeO | NiO | Cr$_2$O$_3$ | CaO | Boron | Loss on Ignition |
|---|---|---|---|---|---|---|---|---|
| Weight per cent | 47.2 | 42.5 | 7.5 | 0.35 | 0.37 | 0.00 | 0.00 | 2.3 |

TABLE 2

*"Standard" olivine screen analysis*

| Tyler Screen | Weight Percent |
|---|---|
| −20+48 | 2.3 |
| −48+65 | 25.5 |
| −65+100 | 12.2 |
| −100+200 | 22.0 |
| −200+325 | 29.1 |
| −325 | 8.9 |

The hydrochloric acid used in the tests was chemically pure acid obtained from J. T. Baker Chemical Company for small scale tests and the commercial constant boiling product was used in pilot studies. Studies were made of the system hydrogen chloride-olivine-water in which the hydrogen chloride was present in a concentration as high as about 37 per cent by weight of the water; namely, compositions corresponding to hydrogen chloride-water ratios that are stable under ordinary conditions. The results indicated that the azeotropic hydrochloric acid mixture (20 percent by weight hydrogen chloride) was the most satisfactory in carrying out the reaction at substantially atmospheric pressures; the main advantage appears due to minimization of hydrogen chloride losses. However, it is recognized that reaction is feasible under sub and super atmospheric pressures and other acid concentrations are operable.

The laboratory apparatus used in studies of the system olivine-hydrochloric acid was a one-liter, three-necked flask fitted with a 1/2 horse-power, variable speed, mercury sealed stirrer; a reflux condenser; a thermometer; and a heating means.

The procedure used in studies of increment addition of the reactants was as follows. It was calculated that 350 milliliters was the stoichiometric quantity of 20 percent hydrochloric acid necessary to dissolve the metallic components of 100 grams of the "standard" olivine. A known mineral increment of 100 grams and a known acid increment of 350 milliliters were charged to the reaction flask, and heated to boiling, the time when the mixture started boiling was designated as zero time. The mixture was then digested at boiling temperatures for a short known time; in order to limit the number of variables under consideration in this study the digestion period was set at 10 minutes. The remaining mineral and acid was thereafter added to the digested mixture in known increments at 10-minute intervals until all the mineral and acid has been treated. After the addition of the last increments the mixture was digested for an additional 10 minutes. The slurry was then filtered hot on a 6-inch Buchner through No. 1 Whatman filter paper with a vacuum of about 28 inches of mercury. Just before cracks appeared in the filter cake it was washed with 750 milliliters of water in 50 milliliter increments, which was in substantial excess of actual requirements. Table 3 is a partial summary of the effect of increment ratio variation in the treatment of olivine with hydrochloric acid.

TABLE 3

*Effect of increment ratio variation*

| Grams Olivine Added at— | | | Filtration and Washing, Rate Gals./sq. ft./hour |
|---|---|---|---|
| 0 Min. | 10 Min. | 20 Min. | |
| 100 | 0 | 0 | 2.9 |
| 60 | 20 | 20 | 5.8 |
| 50 | 50 | 0 | 6.8 |
| 40 | 60 | 0 | 10.4 |
| 30 | 60 | 10 | 14.6 |
| 25 | 75 | 0 | 19.3 |
| 20 | 80 | 0 | 19.1 |
| 20 | 70 | 10 | 24.4 |
| 20 | 60 | 20 | 20.0 |
| 20 | 20 | 60 | 0.5 |
| 15 | 75 | 10 | 12.2 |

The marked increase in filter rates is indicated in Table 3.

In order to overcome excessive foaming and caking of the feed with additions of the second increment, it was found necessary to introduce the mineral and the cold acid together in the form of a slurry. To determine the possible effect of this variation, a series of tests were run wherein the amount of hydrochloric acid used for slurry addition ranged from 25 to 200 milliliters out of a total of 350 milliliters. Twenty-five grams of olivine were added to a quantity of hydrochloric acid ranging from 325 to 150 milliliters and reacted as aforementioned for 10 minutes at the boiling point. At the end of this period, a cold slurry made up of the remaining 75 grams of olivine and the remaining amount of acid and added to the reaction mixture, the zero time for the second increment reaction was arbitrarily taken as the instant the boiling point was regained. The digestion was continued for 40 minutes, the pU index determined, and the slurry neutralized with magnesium oxide. Filtration was carried out as before. A partial summary of the effects of variation in acid increment ratio appears in Table 4.

TABLE 4

*Effect of variation in acid increment ratios*

| 1st Acid Increment ml. 20% HCl | 1st Olivine Increment, Grams | 2nd Acid Increment ml. 20% HCl | 2nd Olivine Increment, Grams | Filter Rate Gal./sq. ft./hour |
|---|---|---|---|---|
| 325 | 25 | 25 | 75 | 15.0 |
| 300 | 25 | 50 | 75 | 20.0 |
| 275 | 25 | 75 | 75 | 15.8 |
| 250 | 25 | 100 | 75 | 13.1 |
| 200 | 25 | 150 | 75 | 12.9 |
| 150 | 25 | 200 | 75 | 8.2 |

A series of plots of pU index at 5-minute intervals on olivine samples of a definite particle size and the same magnesia content showed that the reaction rate was a direct function of particle size, the rate being faster with particles of a smaller size; i. e., greater surface area. Blends of various size olivine particles were prepared and digested in order to ascertain the optimum condition; wide ranges were found effective. However, the presently preferred blend range is one having approximately the following screen analysis:

| Screen Size | Weight Per Cent |
|---|---|
| −40+70 | 30–40 |
| −70+100 | 30–40 |
| −100+200 | 20–10 |
| −200 | 20–10 | since blends approximating this composition reached equilibrium rapidly and could readily and economically be prepared by available milling equipment. Hereinafter, this blend will be referred to as 35–35–15–15 olivine.

Filterability or the filter rate, because of its very close connection with the economic aspects which at present determine the practicability of the invention, has been used as the criteria for determining the optimum reaction time for incremental digestion. Using an optimum increment ratio of 20/80 of the mineral and 85/15 of acid, high filter rates were obtained when the first increments were digested 5 minutes or more and the second increments digested 20 minutes or more. The presently preferred reaction times being about 10 minutes for the first increment and about 30 minutes for the second increment.

There are several alternative methods by which the neutralization can be accomplished; for example, filtration of the digest slurry with neutralization being carried out on the filtrate; direct neutralization of digest slurry with a joint separation of the insoluble residue and any precipitated hydroxides; or a partial neutralization of the digest slurry, followed by a second neutralization or final purification on the resulting filtrate. The presently preferred method being a 2-stage neutralization in which the first stage is the neutralization of the digest slurry with 100 percent of the theoretical magnesium oxide on an acid soluble basis as determined by the pU index at the end of the digestion period. In the second stage or final purification the amount of magnesium oxide is based on the stoichiometric equivalent of the impurities present.

It is possible to carry out the first neutralization and remove about 80 or more percent of the iron in about 1 to 10 minutes. However, it is presently preferred to permit the neutralization to proceed for about 3 minutes for reasons of ease and simplicity in handling large quantities of materials.

The final purification can be carried out either with or without aeration. It is presently preferred that the final neutralization be made with aeration at rates between 50 and 150 cubic feet of air per hour per ton of magnesia in solution and at temperatures about 40 degrees centigrade. This treatment is preferred since the reaction reaches equilibrium in a relatively short time, about 5 minutes, and the resulting solution is almost entirely free of soluble iron.

While it is the present intention to utilize recycled magnesium oxide as the neutralizing reagent, it is to be noted that other grades of magnesium oxide of greater purity have been found more effective chemically but less satisfactory economically.

The following illustrative example shows how this invention may be carried out, but it is not limited thereto. Percentages are by weight unless specifically noted to the contrary.

EXAMPLE I

The dissolution and digestion of 2628.0 pounds of the 35–35–15–15 olivine in 10,692 pounds of 20-percent hydrochloric acid was carried out in two increments. In the first increment 20 percent of the total olivine was digested by 85 percent of the total hydrochloric acid for 10 minutes at 109 degrees centigrade. The second increment of 80 percent of the total olivine and 15 percent of the total acid was added to the digested first increment and the mixture digested for 30 minutes at 109 degrees centigrade. The unreacted acid in the digested slurry was then partially neutralized with a magnesium oxide slurry, the source of which will be clear in the ensuing description, and which contained 130.2 pounds of magnesium oxide; and the following from the makeup solution, 87.1 pounds of magnesium chloride, 0.9 pound of ferrous chloride, and 647.3 pounds of water. The partial neutralization was made 100 degrees centigrade and was allowed to proceed for 3 minutes. Thereafter, the partially neutralized slurry was passed through a vacuum filter. The filter cake was washed with 7,405.4 pounds of water. The washed cake was discarded and the filtrate and a major portion of the washings were combined for further treatment. The minor portion of the washings, 735.2 pounds, was used to form the magnesium oxide neutralizing slurry described above. Thereafter, the combined washings and filtrate was completely neutralized with 10 pounds of magnesium oxide. The second neutralization was carried out for 5 minutes at 40 degrees centigrade and was accompanied by aeration; thereby precipitating insoluble hydroxides of iron and other metals. The neutralized slurry was passed through a filter, washed with 97.2 pounds of water, the combined filtrate and wash collected, and the washed cake discarded. The combined filtrate and wash contained 2693.1 pounds of pure magnesium chloride in a total solution weight of 14,949.2 pounds. This solution can be further processed as desired; however, it is presently preferred to convert the magnesium chloride to pure magnesium oxide since such a process will simultaneously permit the recovery of hydrogen chloride and a pure grade of basic magnesium oxide for use as a neutralizer in earlier steps of the invention.

A simple way to carry out the preferred processing steps would be to evaporate the pure magnesium chloride solution to about a 25 percent solution, adding sufficient magnesium oxide obtained from a later step to form a flakeable mixture, flaking the mixture, and calcining the flaked magnesium chloride-magnesium oxide mixture. The hydrogen chloride and water driven off can readily be absorbed to form hydrochloric acid and made up to a 20-percent solution by the addition of water as necessary. The calcined product, pure magnesium oxide, is recovered and minor portions are recycled through the system to aid in neutralization and flaking.

As shown in the foregoing description and example, magnesium chloride solution of a high degree of purity and concentration can be produced easily and economically by the increment treatment of magnesium silicate base minerals with hydrochloric acid. The increment addition of reactants give the treated mixture an exceptionally high filter rate; which, in turn, results in a more concentrated solution and the concurrent obvious economic advantages. It has been found that employing this process without increment treatment of the reactants results in such a low filter rate that such a method appears impractical commercially.

While the invention has been particularly described as a batch process, it is not limited thereto; and similar improvements in filter rate can be obtained by the continuous addition of the reactants after the digestion of the first increment.

While the invention has been particularly described in connection with the production of magnesium chloride from olivine, it is not limited thereto; since many silicate base magnesium minerals are decomposed by hydrochloric acid and can be used in accordance with this invention to produce pure magnesium chloride solutions.

While the invention has been particularly described employing certain time, temperature, and concentration ranges, it is not limited thereto, since the close dependency of these factors on one another will permit wide deviation from the conditions set forth above.

Since many apparently widely differing embodiments of the invention will occur to one skilled in the art, the invention is not limited to the specific details illustrated and described, and various changes can be made therein without departing from the spirit and scope thereof.

What is claimed is:

1. In a process for the production of magnesium chloride involving the treatment of a magnesium silicate mineral with hydrochloric acid, the improvement which comprises carrying out said treatment by the increment addition of one reactant to the other, wherein the first mineral increment is between about 15 and 35 percent of the weight of the total mineral and the first acid increment is between about 65 and 95 percent by weight of the theoretical quantity of acid required for about 85 percent decomposition of the mineral, and the balance of mineral and acid is added in a plurality of increments on the completion of the reaction of the preceding increment, whereby gellation of liberated silica compounds is substantially inhibited.

2. In a process for the production of magnesium chloride involving the treatment of a magnesium silicate mineral with hydrochloric acid, the improvement which comprises carrying out said treatment by the increment addition of one reactant to the other, wherein the first mineral increment is between 15 and 35 percent of the weight of the total mineral and the first acid increment is between about 65 and 95 percent by weight of the theoretical quantity of acid required for about 85 percent decomposition of the mineral, and the balance of mineral and acid being added in a second increment on completion of the reaction of the first increment, whereby gellation of liberated silica compounds is substantially inhibited.

3. In a process for the production of magnesium chloride involving the treatment of a magnesium silicate mineral with hydrochloric acid at temperatures between about 90 to 110 degrees centigrade, the improvement which comprises carrying out said treatment by the increment addition of one reactant to the other, wherein the first mineral increment is between 15 and 35 percent of the weight of the total mineral and the first acid increment is between about 65 and 95 percent by weight of the theoretical quantity of acid required for about 85 percent decomposition of the mineral, and the balance of mineral and acid being added in a second increment on completion of the reaction of the first increment, whereby gellation of liberated silica compounds is substantially inhibited.

4. In a process for the production of magnesium chloride involving the hydrochloric acid treatment of a magnesium silicate mineral ground to a size not greater than minus 20 mesh, the improvement which comprises carrying out said treatment by the increment addition of one reactant to the other, wherein the first mineral increment is between 15 and 35 percent of the weight of the total mineral and the first acid increment is between about 65 and 95 percent by weight of the theoretical quantity of acid required for about 85 percent decomposition of the mineral, and the balance of mineral and acid being added in a second increment on completion of the reaction of the first increment, whereby gellation of liberated silica compounds is substantially inhibited.

5. In a process for the production of magnesium chloride involving the hydrochloric acid treatment of a magnesium silicate mineral ground to a size not greater than minus 20 mesh and having a major portion of the ground mineral in sizes not greater than minus 200 mesh, the improvement which comprises carrying out said treatment by the increment addition of one reactant to the other, wherein the first mineral increment is between 15 and 35 percent of the weight of the total mineral and the first acid increment is between about 65 and 95 percent by weight of the theoretical quantity of acid required for about 85 percent decomposition of the mineral, and the balance of mineral and acid being added in a second increment on completion of the reaction of the first increment, whereby gellation of liberated silica compounds is substantially inhibited.

6. In a process for the production of magnesium chloride involving the hydrochloric acid treatment of olivine, ground to a size not greater than minus 20 mesh and having a major portion of the ground mineral in sizes not greater than minus 200 mesh, with hydrochloric acid at temperatures between 90 and 110 degrees centigrade, the improvement which comprises carrying out said treatment by the increment addition of one reactant to the other wherein the first mineral increment is beween about 15 and 35 percent of the weight of the total mineral and the first acid increment is between about about 65 and 95 percent by weight of the theoretical quantity of acid required for about 85 percent decomposition of the mineral, and the balance of mineral and acid being mixed and added as a second increment on completion of the reaction of the first increment, whereby gellation of the liberated silica compounds is substantially inhibited and the filter rate of the treated slurry is substantially increased.

7. In the process for the production of magnesium chloride involving the treatment of olivine with 20 percent hydrochloric acid at temperatures about 109 degrees centigrade, the improvement which comprises carrying out said treatment by the increment addition of one reactant to the other wherein the first mineral increment is 20 percent of the mineral and the first acid increment is 85 percent of the theoretical quantity of acid required for 85 percent decomposition of the mineral, and the balance of the mineral and acid added as a second increment on completion of reaction of the first increment, whereby gellation of the liberated silica compounds is substantially inhibited and the filter rate of the treated slurry is substantially increased.

EDWIN A. GEE.
MORTON T. PAWEL.

REFERENCES CITED

The following references are of record in the file of this patent:

UNITED STATES PATENTS

| Number | Name | Date |
| --- | --- | --- |
| 1,454,583 | Goldschmidt | May 8, 1923 |
| 2,349,556 | Kleckner | May 23, 1944 |
| 2,384,009 | Brandenburg | Sept. 4, 1945 |
| 2,398,493 | Butt et al. | Apr. 16, 1946 |